Figure 1:
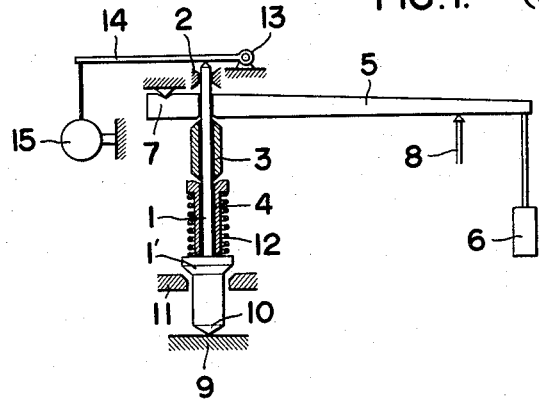

Jan. 28, 1964  KAZUHIKO AKASHI ETAL  3,119,255
APPARATUS FOR MEASURING THE HARDNESS OF A MATERIAL
Filed April 3, 1962

INVENTORS.
KAZUHIKO AKASHI
MISAO MASHIMO
BY
*M. Glew and Toren*
ATTORNEYS

United States Patent Office 3,119,255
Patented Jan. 28, 1964

3,119,255
APPARATUS FOR MEASURING THE HARDNESS
OF A MATERIAL
Kazuhiko Akashi, Shinagawa-ku, Tokyo, and Misao Mashimo, Chiyoda-ku, Tokyo, Japan, assignors to Kabushiki Kaisha Akashi Seisakusho, Tokyo, Japan
Filed Apr. 3, 1962, Ser. No. 184,896
Claims priority, application Japan Aug. 30, 1961
2 Claims. (Cl. 73—83)

This invention relates to new and useful improvements in apparatus for measuring the hardness of a material by measuring the difference in penetration of a diamond tip under minor load and major load, for example in Rockwell testing devices.

Prior to the present invention it has been proposed to provide apparatus for measuring the hardness of a material in which a test rod, which serves to transmit the penetration of the penetrator connected to said test rod to a dial gauge through an arm which rests on a knife edge fixed to the test rod, is supported in a sliding bearing. In such an apparatus consequently, a clearance occurs necessarily between the sliding bearing and the test rod. Due to the existence of said clearance, the test rod can swing laterally through the breadth of said clearance through which the knife edge of the test rod moves along said arm and therefore the lever ratio is changed, which results in a wrong measurement or a fluctuation of the indicated values. In order to minimize said clearance the sliding bearing and the corresponding part of the test rod must be finished with special care under a very small tolerance. The clearance becomes nevertheless necessarily large due to wear as time passes. In addition, there is as a matter of course a sliding friction between the bearing and the test rod, whereby the value of the minor load applied is fluctuated, which results in a wrong measurement. In such a known apparatus for measuring the hardness of a material the sliding block is in a surface contact with the collar of the penetrator. If these contact surfaces are not in a good state, the sliding block is tilted when the major load is applied, whereby the test rod is subjected to a lateral force and therefore tilted, which results in a wrong measurement and in a wear of the bearing. Furthermore, in known apparatus for measuring hardness, the test rod extends through the intermediary member and, consequently, the knife edges fixed to this must have a fork-shaped form the breadth of which is larger. The result is that the test rod is subjected to a lateral force when the major load is applied if the parallelism of said knife edges is not so exact.

With the foregoing in mind, one object of the present invention is to provide an apparatus for measuring the hardness of a material of the type described in which the test rod is supported by a leaf spring instead of the sliding bearing. As a consequence of this arrangement the disadvantages due to the existence of the clearance between the sliding bearing and the test rod, that is, the fluctuation of the lever ratio and that of the minor load can be eliminated. When the leaf spring is subjected to a displacement, force exerted on the test rod is developed by the leaf spring, this force being very small as compared with the minor load, so that it may be included into the spring constant of the minor load spring. As a matter of course said force of the leaf spring may be negligible in comparison with the major load.

Another object of the invention is to provide an apparatus for measuring the hardness of a material of the character set forth having a knife edge contact between the sliding block and the test rod, which results in no lateral force exerted on the test rod when the major load is applied.

A further object of the invention is to provide an apparatus for measuring the hardness of a material having knife edges of a small width due to the fact that the test rod does not extend through the sliding block and the intermediary member. Accordingly there is no necessity for a strict parallelism of said knife edges.

Figure 2:
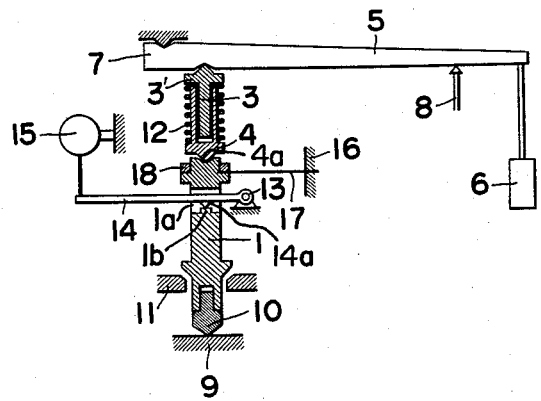

These and other objects of the invention and the various features and details of the construction and operation thereof are hereinafter fully set forth and described with reference to the drawing, in which:

FIG. 1 is a sectional view through a Rockwell testing device hitherto known, and FIG. 2 is a sectional view through an apparatus for measuring the hardness of a material made according to the present invention.

Referring now more particularly to the drawing, reference numeral 10 designates a penetrator of the apparatus to which are secured a test rod 1 being in a knife edge contact with a lever arm 14 adapted to transmit the penetration of said penetrator 10 to a dial gauge 15. The minor load is applied to a test specimen 9 under the influence of a minor load spring 12, while the major load is applied under the influence of a major load weight 6 through a lever arm 5, an intermediary member 3 and a sliding block 4. 7, 8 and 11 designate a fulcrum for the lever arm 5, means adapted to lock the lever arm 5 while the major load weight 6 is not actuated and a support for the penetrator 10, respectively.

In FIG. 1, which shows a hitherto known apparatus, that is, the Rockwell testing device, the test rod 1 extends through the member 3 and the slide 4, the latter being in a surface contact with the collar 1' of the penetrator 10. Accordingly there is the possibility of tilting the test rod 1 by the slide 4 when the major load is applied if the contact surfaces between the collar 1' of the penetrator 10 and the slide 4 are not in a good state. The lever arm 14 which cooperates with the dial gauge 15 rests on a knife edge fixed to the test rod 1.

The test rod 1 is here supported in a sliding bearing 2, whereby a clearance occurs necessarily between this bearing and the test rod 1. As a consequence thereof the test rod 1 can swing laterally through the breadth of said clearance and the position of the knife edge fixed to the test rod fluctuates on the lever arm 14.

Because of the extending of the test rod 1 through the member 3, the knife edge fixed to the latter must be necessarily fork-shaped and therefore larger in breadth.

Referring to FIG. 2, which shows an apparatus for measuring the hardness of a material according to the present invention, the penetrator 10 and the test rod 1 are supported by a leaf spring 17, one end of which is rigidly secured to the housing 16 of the testing device and another end of which is fixedly mounted on the test rod 1 by means of a nut 18. The dimensions and the spring constant of the leaf spring 17 are suitably so chosen that it is in conformity with each case. From this arrangement it follows that there is no clearance and no sliding friction experienced at the bearing part of the test rod 1.

As shown at FIG. 2, the test rod 1 does not extend through a sliding block 4, as is the case with the prior art arrangement of FIG. 1. As illustrated, the test rod 1 has a lateral aperture 1a therethrough through which the lever arm 14 extends. The lever arm 14 has one end thereof coupled with a pivot 13. Also, as shown, the lever arm 14 includes a knife edge fulcrum 14a which is received in a complementary knife edge bearing 1b, which is integral with the test rod 1. The opposite end of the lever arm 14 is connected, as indicated, with the gauge 15.

Mounted above the test rod 1 is the block 4 which is borne in a suitable complementary knife edge bearing of the test rod 1; the knife edged fulcrum 4a of the block 4 being situated in said knife edge bearing. The block 4 has, as shown, a longitudinal hollow portion which receives the stud 3; the stud 3 being, when emplaced as shown, intermediate the lever arm 5 and block 4. The stud 3 is provided with a knife edge fulcrum portion 3' which is received in the notched-out portion of the lever arm 5. Advantageously, with the arrangement of FIG. 2, the knife edges, hereinbefore discussed, may be made much smaller than those in the FIG. 1 arrangement.

While a particular embodiment of the present invention has been illustrated and described herein, it is not intended to limit the invention to such disclosure and changes and modifications may be made therein and thereto within the scope of the claims.

I claim:

1. Apparatus for measuring the hardness of a material, comprising: a housing, a leaf spring cantilevered from said housing, a penetrator having a tip for penetrating the material to be measured, said penetrator being supported from said leaf spring; a block member arranged for movement toward said penetrator; minor load spring means acting on said block member to move said block member against said penetrator and apply a minor load thereto; stud means arranged for movement against said block member; and lever means for applying a major load on said stud means through said block member and to said penetrator.

2. The apparatus according to claim 1, wherein said penetrator and block member are axially aligned, said block member and said penetrator having complimentary knife edge surfaces in contacting relationship.

No references cited.